(12) United States Patent
Zhang

(10) Patent No.: US 11,312,121 B2
(45) Date of Patent: Apr. 26, 2022

(54) BUFFER COMPONENT AND PRESSING DEVICE

(71) Applicants: HKC Corporation Limited, Guangdong (CN); Chongqing HKC Optoelectronics Technology Co., Ltd., Chongqing (CN)

(72) Inventor: Guanghui Zhang, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 116 days.

(21) Appl. No.: 16/471,563

(22) PCT Filed: Oct. 23, 2017

(86) PCT No.: PCT/CN2017/107254
§ 371 (c)(1),
(2) Date: Jun. 20, 2019

(87) PCT Pub. No.: WO2019/047341
PCT Pub. Date: Mar. 14, 2019

(65) Prior Publication Data
US 2019/0389192 A1 Dec. 26, 2019

(30) Foreign Application Priority Data
Sep. 6, 2017 (CN) .......................... 201710797334.X

(51) Int. Cl.
*B32B 37/00* (2006.01)
*B32B 37/10* (2006.01)

(52) U.S. Cl.
CPC .......... *B32B 37/0046* (2013.01); *B32B 37/10* (2013.01); *B32B 2457/20* (2013.01)

(58) Field of Classification Search
None
See application file for complete search history.

(56) References Cited

U.S. PATENT DOCUMENTS

| | | | |
|---|---|---|---|
| 6,245,177 B1 * | 6/2001 | Luhmann | A47G 1/175 156/182 |
| 2015/0328409 A1 * | 11/2015 | Kuwahara | A61M 5/31573 604/220 |
| 2016/0089216 A1 * | 3/2016 | Muller | A61M 5/2425 433/90 |

FOREIGN PATENT DOCUMENTS

| CN | 102445778 A | 5/2012 |
|---|---|---|
| CN | 106455355 A | 2/2017 |

OTHER PUBLICATIONS

CN208877676U, Bibliographic data, 1 page, English machine translation, May 21, 2019. (Year: 2019).*

(Continued)

*Primary Examiner* — Linda L Gray

(57) ABSTRACT

Disclosed is a buffer component and a pressing device, the buffer component is applied to the pressing device. The pressing device includes an anisotropic conductive film pressure knife, the buffer component includes an inserting part, which is made of a first elastic material, and the inserting part is configured to insert into a lower end of the anisotropic conductive film pressure knife; and a buffering part, which is made of a second elastic material, the buffering part is configured to closely attach to a lower end surface of the lower end of the anisotropic conductive film pressure knife.

10 Claims, 3 Drawing Sheets

(56) References Cited

OTHER PUBLICATIONS

CN208877676U, Description, 6 pages, English machine translation, May 21, 2019. (Year: 2019).*
International Search Report of PCT Patent Application No. PCT/CN2017/107254 dated Jun. 7, 2018.

* cited by examiner

BUFFER COMPONENT AND PRESSING DEVICE

FIELD

The present disclosure generally relates to the technical field of processing equipment, and more particularly relates to a pressing device which is for attaching anisotropic conductive film (ACF) on a display panel, and a buffer component defined on the pressing device.

BACKGROUND

With the rapid development of the electronic products towards a direction of becoming light, thin, short, and small, various portable electronic products almost all use liquid crystal displays (LCD) as the display panels, thus the liquid crystal display has become an important component. A liquid crystal display not only includes a liquid crystal panel, but also a driving chip which is connected to the liquid crystal panel for controlling a display signal. We can connect the liquid crystal display panel with the driving chip by an ACF hot pressure welding process. The ACF hot pressure welding process is carried out by using the ACF to pre-press and bond an IC or an integrated circuit to a LCD glass substrate. During pre-pressing, a pressing device having different buffer components defined there on may give rise to different bonding result. The current buffer components are commonly packaged type and box-type, the packaged type buffer component is not fixedly fixed in use and is prone to fall off, resulting that the bond would have a high failure rate which is greater than 2%. The box-type buffer component has a punching supporter in large size, which is prone to damage the product during the punching supporter is changed, thus the using and changing of the box-type buffer component are inconvenient, the efficiency of a bonding machine using the box-type buffer component is also affected. Further, both the two kinds buffer components need to be changed frequently, almost every two days for once, and the changing always takes a long time of about 10 minutes for each time, resulting a long down time and a low efficiency.

SUMMARY

The present disclosure provides a buffer component and a pressing device, which can improve the pressing device's attaching success rate of bonding the ACF film, in which the buffer component can be excellently fixed, and is convenient to be used and changed, thus the down time can be reduced and the efficiency of the pressing device can be improved, the risk of damaging the product during the process of changing the buffer component can also be reduced.

One aspect, the present disclosure provides a buffer component, applied in a pressing device which includes an anisotropic conductive film pressure knife. The Buffer component includes:

an inserting part, made of a first elastic material, the inserting part is configured to insert into a lower end of the anisotropic conductive film pressure knife; and a buffering part, made of a second elastic material, the buffering part connects to the inserting part, the buffering part is configured to closely attach to a lower end surface of the lower end of the anisotropic conductive film pressure knife.

Another aspect, the present disclosure provides a buffer component, applied in a pressing device. The pressing device includes an anisotropic conductive film pressure knife, the buffer component includes:

an inserting part, configured to insert into a lower end of the anisotropic conductive film pressure knife, a cross section of the inserting part is a regular polygon; and a buffering part, connected to the inserting part, the buffering part is configured to closely attach to a lower end surface of the lower end of the anisotropic conductive film pressure knife, a cross section of the buffering part is a rectangle;

the buffer component is an integrated element made of rubber.

Another aspect, the present disclosure also provides a pressing device, which is configured to press an anisotropic conductive film on a display panel. The pressing device includes an anisotropic conductive film pressure knife and a buffer component. A lower end of the anisotropic conductive film pressure knife defines a groove. The buffer component includes:

an inserting part, made of a first elastic material, the inserting part is received in the groove of the anisotropic conductive film pressure knife; and a buffering part, made of a second elastic material, the buffering part is configured to closely attach to a lower end surface of the lower end of the anisotropic conductive film pressure knife.

The exemplary embodiment of the present disclosure provides a buffer component and a pressing device, the buffer component includes the inserting part and the buffering part, the inserting part is configured to insert into the lower end of the anisotropic conductive film pressure knife, to fix the buffer component at the lower end of the anisotropic conductive film pressure knife, the buffer component is attached at the lower end surface of the anisotropic conductive film pressure knife. The inserting part and the buffering part are both made of the elastic material, the buffering part can provide buffer during the process of attaching the ACF film through the pressing device, to improve the attaching rate and the success rate. The buffer part connects to the anisotropic conductive film pressure knife through the inserting mode, as such the buffer component can be fixedly bonded with the anisotropic conductive film pressure knife, the bonding is much stronger, and the buffer component is not prone to fall off, and the inner cavity of the device is saved. The changing cycle is longer, the changing time is shorted, it is convenient to manage and change the buffer component, the efficiency of the ACF attaching machine is improved, the down time of the ACF attaching machine is also reduced.

BRIEF DESCRIPTION OF THE DRAWINGS

To better illustrate the technical solutions that are reflected in various embodiments according to this disclosure or that are found in the prior art, the accompanying drawings intended for the description of the embodiments herein or for the prior art will now be briefly described, it is evident that the accompanying drawings listed in the following description show merely some embodiments according to this disclosure, and that those having ordinary skill in the art will be able to obtain other drawings based on the arrangements shown in these drawings without making inventive efforts, where in these drawings.

DETAILED DESCRIPTION

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present invention without creative efforts shall fall within the protection scope of the present invention.

It should be understood that the terms used in this specification and claims such as "comprising" and "including" refer to the existence of the described characteristics, steps, operations, elements and/or components, without excluding one or more other characteristics, steps, operations, elements and/or components, or the existence or addition of their sets.

It is also to be understood that, the terms described in the present disclosure are only for description of specific embodiment, rather than limiting the scope of the disclosure. As described in the specification and claims of the present disclosure, "a", "one" and "this" is used for description of subject including the plural form, unless other situation is clearly defined in the context.

Figure 1:
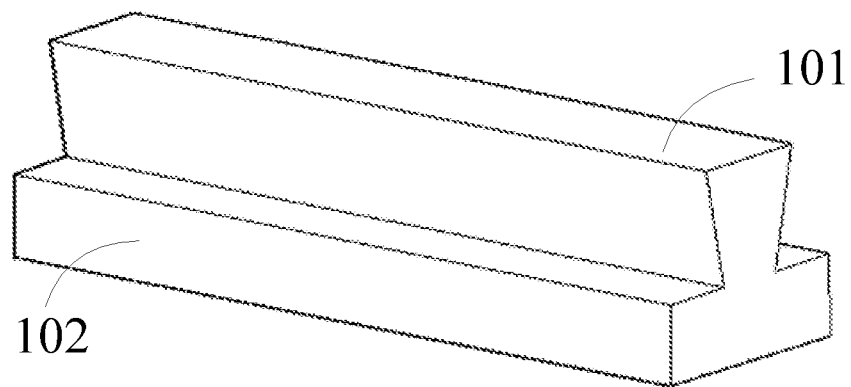
FIG. 1 is a structure diagram of the buffer component of the present disclosure according to an exemplary embodiment.

Referring to FIG. 1, FIG. 1 is a structure diagram of the buffer component 10 of the present disclosure according to an exemplary embodiment. The buffer component 10 of the exemplary embodiment can be mounted on an anisotropic conductive film pressure knife 20 of the pressing device, referring to FIGS. 2-3.

Referring to FIGS. 1-3 and 5, in the exemplary embodiment, the buffer component 10 includes an inserting part 101 and a buffering part 102.

The inserting part 101 is made of a first elastic material, the inserting part 101 is configured to insert into a groove 201 formed at a lower end of the anisotropic conductive film pressure knife 20. The buffering part 102 is made of a second elastic material, the buffering part 102 is connected to the inserting part, the buffering part 102 is configured to closely attach to a lower end surface of the lower end of the anisotropic conductive film pressure knife 20. In detail, the first elastic material is the same as the second elastic material, or, the first elastic material is different from the second elastic material. The elastic material is configured to provide buffering for the anisotropic conductive film pressure knife 20 of the pressing device, therefore, when the ACF film is attached on the display panel by the pressing device, the ACF film is not easily to be broken, so as to achieve a higher attaching rate and a higher qualification rate.

In the exemplary embodiment, the first material is the same with the second material, can the first material and the second material are both silica gel. And the inserting part 101 is integrated with the buffering part 102. It is to be understood that, the elastic material can also be a rubber, or an elastic plastic. The inserting part 101 includes a top end surface inserted in the lower end of the anisotropic conductive film pressure knife 20, and a lower end surface connected to the buffering part 102, a cross section of the inserting part 101 is a regular polygon. In detail, the cross section of the inserting part 101 is a trapezoid, as such the inserting part 101 can be clamped in the groove 201 of the anisotropic conductive film pressure knife 20, therefore, the buffer component 10 can be fixed on the pressing device, and cannot be escaped from the pressing device. In the exemplary embodiment, the cross section of the inserting part 101 is the trapezoid which is wide at the top and narrow at the bottom, as such, the buffer component 10 is fixed in the groove 201 of the anisotropic conductive film pressure knife 20. In some feasible exemplary embodiments, for example, in the exemplary embodiment, the topline W1 of the trapezoid has a length of 1.6 centimeter, the baseline W2 of the trapezoid has a length of 1 centimeter, the height H1 of the trapezoid has a length of 1.5 centimeter. A cross section of the buffer part 102 is a rectangle, a length of the buffering part 102 is equal to a length of the anisotropic conductive film pressure knife 20, and a width of the buffering part 102 is equal to a width of the anisotropic conductive film pressure knife 20, and the buffering part 102 is closely attached with the lower end surface of the anisotropic conductive film pressure knife 20, as such the buffering part 102 can provides buffer for the anisotropic conductive film pressure knife 20. In some feasible exemplary embodiments, for example, in the exemplary embodiment, a length L of the rectangle is 3 centimeter, a height H2 of the rectangle is 1 centimeter.

One buffer component of the present disclosure according to the exemplary embodiment is applied in the pressing device. The pressing device includes the anisotropic conductive film pressure knife 20, the buffer component includes: the inserting part, which is made of the first elastic material, the inserting part is configured to insert into the lower end of the anisotropic conductive film pressure knife 20; the buffering part, which is made of the second elastic material, the buffering part connects to the inserting part, the buffering part is configured to attach to the lower end surface of the lower end of the anisotropic conductive film pressure knife, so as to improve the attaching success rate of an ACF attaching machine. The buffer component is tightly fixed with the anisotropic conductive film pressure knife 20, it is convenient to use and change the buffer component. And the using condition of the buffer component can be measured, as such it is convenient to manage the buffer component, so as to improve the efficiency and reduce the down time, the risk of damaging the product during the process of changing the buffer component can also be reduced.

Referring to FIG. 1 again, FIG. 1 shows a buffering component of the present disclosure according to an exemplary embodiment, the buffering component can be applied in the pressing device. The pressing device includes an anisotropic conductive film pressure knife 20. The buffering component 10 is an integrated element made of silica gel, the buffering component 10 includes the inserting part 101 and the buffering part 102.

The inserting part 101 is configured to mount into the groove 201 formed on the lower end of the anisotropic conductive film pressure knife 20, the cross section of the inserting part 101 is regular polygon, as such the inserting part 101 can be clamped in the groove 201 of the anisotropic conductive film pressure knife 20, therefore, the buffer component 10 can be fixed on the anisotropic conductive film pressure knife 20, and the buffer component is not easy to fall off. The cross section of the buffering part 102 is a rectangle, and the buffering part 102 connects to the inserting part, the length of buffering part 102 is equal to the length of the anisotropic conductive film pressure knife 20, the width of buffering part 102 is equal to the width of the anisotropic conductive film pressure knife 20. The buffering part 102 is closely attached at the lower end surface of the lower end of the anisotropic conductive film pressure knife 20, to provide buffering for the anisotropic conductive film pressure knife 20.

One buffer component of the present disclosure according to the exemplary embodiment is applied in the pressing device. The pressing device includes the anisotropic conductive film pressure knife 20, the buffer component includes: the inserting part, the inserting part is configured to insert into the lower end of the anisotropic conductive film pressure knife 20, the cross section of the inserting part is regular polygon; the buffering part, the buffering part connects to the inserting part, the buffering part is configured to attach to the lower end surface of the lower end of the anisotropic conductive film pressure knife, so as to improve the attaching success rate of an ACF attaching machine. The buffer component is tightly fixed with the anisotropic conductive film pressure knife 20, it is convenient to use and change the buffer component. And the using condition of the buffer component can be measured, as such it is convenient to manage the buffer component, so as to improve the efficiency and reduce the down time, the risk of damaging the product during the process of changing the buffer component can also be reduced.

Figure 2:
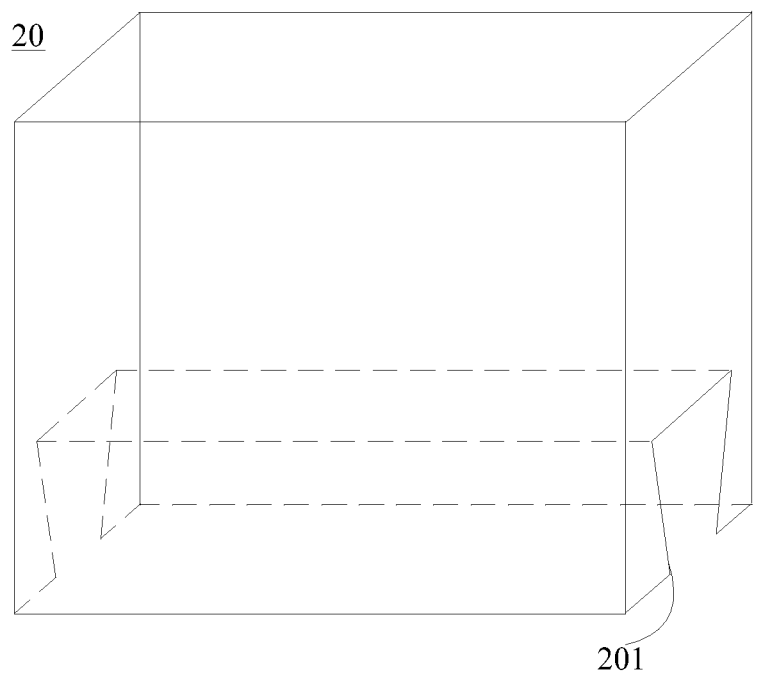
FIG. 2 is a structure diagram of the anisotropic conductive film pressure knife of the pressing device of the present disclosure according to an exemplary embodiment.
Figure 3:
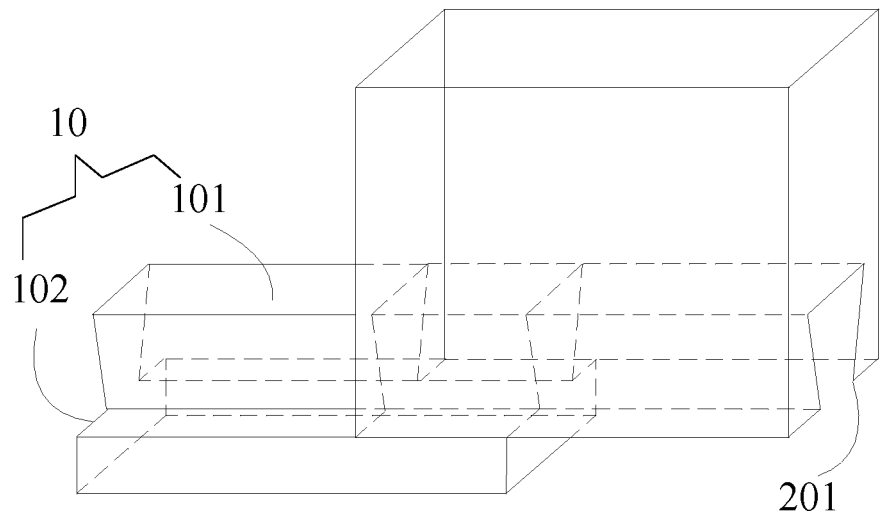
FIG. 3 is a diagram of mounting the buffer component shown in FIG. 1 to the anisotropic conductive film pressure knife shown in FIG. 2.
Figure 5:
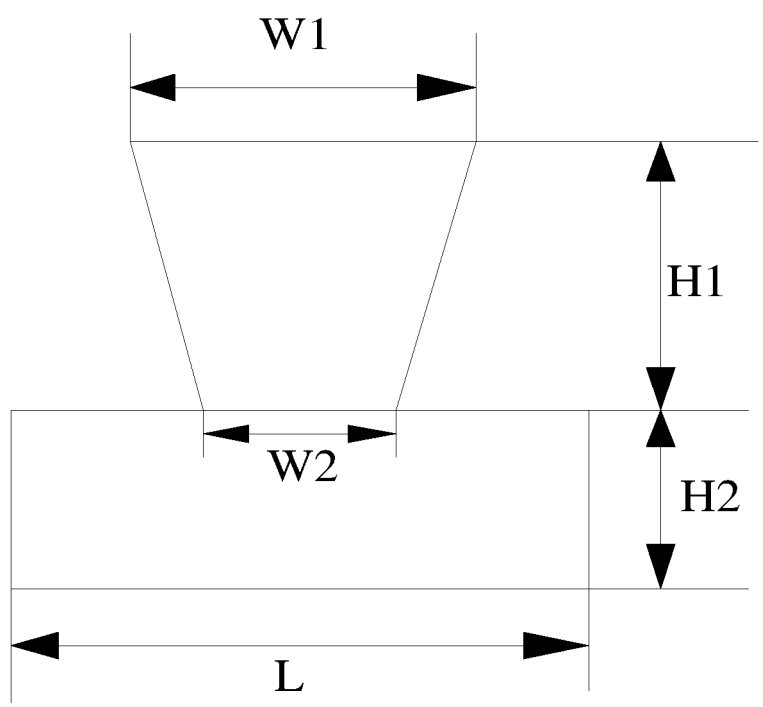
FIG. 5 is a cross section of the inserting part of the buffer component of the present disclosure according to an exemplary embodiment.

Referring to FIGS. 2-3 and 5, FIG. 2 is a structure diagram of the anisotropic conductive film pressure knife of the pressing device of the present disclosure according to an exemplary embodiment. FIG. 3 is a diagram of mounting the buffer component shown in FIG. 1 to the anisotropic conductive film pressure knife shown in FIG. 2.

Referring to the figures, the pressing device in the exemplary embodiment includes the anisotropic conductive film pressure knife 20 and the buffer component 10 mounted in the lower end of the anisotropic conductive film pressure knife 20. Of course, the pressing device further includes other existing components, while the details are not redundantly described herein. The anisotropic conductive film pressure knife 20 is connected to a power device of the ACF attaching machine, the power device can provide power to the anisotropic conductive film pressure knife 20, the lower end of the anisotropic conductive film pressure knife 20 defines a groove 201, the groove 201 is matched with the inserting part 101 of the buffer component 10 in shape, the groove 201 has an structure which is wide at the top and narrow at the bottom. For example, the inserting part 101 of the buffer component 10 in the exemplary embodiment and the groove 201 of the anisotropic conductive film pressure knife 20 are both trapezoid. In some feasible exemplary embodiments, for example, in the exemplary embodiment, the cross section of the inserting part 101 is a trapezoid. The topline W1 of the trapezoid has a length of 1.6 centimeter, the baseline W2 of the trapezoid has a length of 1 centimeter, the height H1 of the trapezoid has a length of 1.5 centimeter. In the exemplary embodiments, referring to FIG. 2, the cross section of the groove 201 is a trapezoid. In some feasible exemplary embodiments, for example, in the exemplary embodiment, the cross section of the buffer part 102 is a rectangle, the length L of the rectangle is 3 centimeter, the height H2 of the rectangle is 1 centimeter. The length of the buffering part 102 is equal to the length of the lower end surface of the anisotropic conductive film pressure knife 20, and the width of the buffering part 102 is equal to the width of the lower end surface of the anisotropic conductive film pressure knife 20. When the pressing device works, the buffering part 102 provides a buffer between the anisotropic conductive film pressure knife 20 and the ACF film, to improve the attaching success rate. The inserting part 101 is inserted in the groove 201, so as to fix the buffer component 10 on the anisotropic conductive film pressure knife 20. As the inserting part 101 is trapezoid in shape, the buffer component 10 is not easy to fall off. The the inserting part 101 of the buffer component 10 is matched with the groove 201 of the anisotropic conductive film pressure knife 20 in shape, when changing the buffer component 10, the inserting part 101 of the buffer component 10 can be gradually filled into the groove 201 along the groove 201. Referring to FIG. 3, the buffer component 10 can be mounted on the anisotropic conductive film pressure knife 20 from left to right or from right to left, as such it easy to change the buffer component 10, the down time is reduced, so as to achieve a higher efficiency.

One pressing device provided by the exemplary embodiment of the present disclosure is configured to press the anisotropic conductive film on the display panel. The pressing device includes the anisotropic conductive film pressure knife, the lower end of the anisotropic conductive film defines a groove; and the buffer component, the buffer component includes: the inserting part, which is made of the first elastic material, the inserting part is configured to insert into the groove of the anisotropic conductive film pressure knife; the buffering part, which is made of the second elastic material, the buffering part connects to the inserting part, the buffering part is configured to closely attach to the lower end surface of the lower end of the anisotropic conductive film pressure knife, so as to improve the attaching success rate of the ACF attaching machine. The buffer component is tightly fixed with the anisotropic conductive film pressure knife, it is convenient to use and change the buffer component. And the using condition of the buffer component can be measured, as such it is convenient to manage the buffer component, so as to improve the efficiency and reduce the down time, the risk of damaging the product during the process of changing the buffer component can also be reduced.

Figure 4:
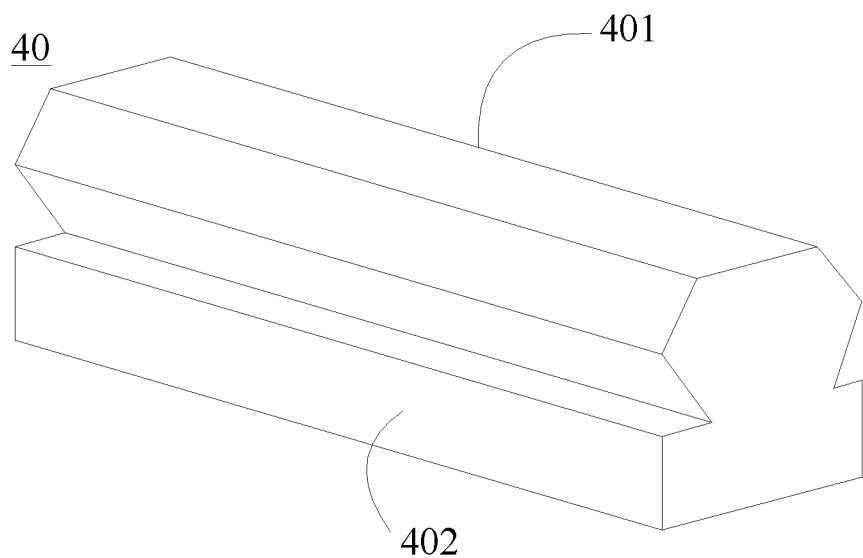
FIG. 4 is a structure diagram of another buffer component of the present disclosure according to an exemplary embodiment.

Referring to FIG. 4, which is a structure diagram of another buffer component of the present disclosure according to another exemplary embodiment. In the exemplary embodiment, the buffering component 40 includes an inserting part 401 and a buffering part 402.

The inserting part 401 is made of the first elastic material, and the inserting part 401 is configured to insert into the groove formed at the lower end surface of the lower end of the anisotropic conductive film pressure knife 20; the buffering part 402 is made of the second elastic material, the buffering part is closely attached with the lower end surface of the lower end of the anisotropic conductive film pressure knife 20. In detail, the first material is the same with the second material, or the first material is different from the second material, the elastic material can provide buffer for the anisotropic conductive film pressure knife 20 of the pressing device. Therefore, when the pressing device attaches the ACF film on the display panel, the ACF film is not easily to be broken, so as to achieve a higher attaching rate and a higher qualification rate. In the exemplary embodiment, the first material is the same with the second material, can the first material and the second material are both silica gel. And the inserting part 401 is integrated with the buffering part 402. In detail, the elastic material can also be a rubber, or an elastic plastic. The inserting part 401 includes a top end surface inserted in the lower end of the anisotropic conductive film pressure knife 20, and a lower end surface connected to the buffering part 402. In the exemplary embodiment, the inserting part 401 has a hexagon structure, as such the buffer 40 can be fixed in the groove of the anisotropic conductive film pressure knife 20. It is to be understood that, in another exemplary embodiment of the present disclosure, the inserting part 401 can have other regular polygonal structure, the length of the buffering part 402 is equal to the length of the anisotropic conductive film pressure knife 20, and the width of the buffering part 402 is equal to the width of the anisotropic conductive film pressure knife 20, and the buffering part 402 is closely attached with the lower end surface of the anisotropic conductive film pressure knife 20, as such the buffering part 402 can provides buffer for the anisotropic conductive film pressure knife 20.

In the above exemplary embodiments, a buffer component and a pressing device are provided, the inserting part of the buffer component is matched with the groove of the pressing device in shape, as such the buffer component can fixedly connects to the pressing device to prevent the buffer component from being escaped from the pressing device, so as to improve the attaching success rate of the ACF attaching machine. Furthermore, as the inserting part of the buffer component is matched with the groove of the pressing device in shape, when the buffer component needs to be changed, the buffer component can be placed into or took out along sides of the groove, as such it easy to change the buffer component, the down time of the ACF attaching machine for changing the buffer component can be reduced, so as to achieve a higher efficiency, and it is also convenient to manage.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure. Therefore, the scope of protection of this disclosure shall be subject to the claims.

What is claimed is:

1. A buffer component, applied in a pressing device configured for attaching an anisotropic conductive adhesive film on a display panel, the pressing device comprising an anisotropic conductive film pressure knife, wherein, the buffer component comprises:
    an inserting part, made of a first elastic material, wherein the inserting part is configured to insert into a groove of a lower end of the anisotropic conductive film pressure knife, the inserting part is matched with the groove of the anisotropic conductive film pressure knife in shape, when changing the buffer component, the inserting part is gradually filled into the groove along the groove; and
    a buffering part, made of a second elastic material, wherein the buffering part connects to the inserting part, the buffering part is configured to attach to a lower end surface of the lower end of the anisotropic conductive film pressure knife;
    wherein a cross section of the inserting part is a trapezoid, a cross section of the buffering part is a rectangle, a topline of the trapezoid has a length of 1.6 centimeter, a baseline of the trapezoid has a length of 1 centimeter, a height of the trapezoid has a length of 1.5 centimeter, a length of the rectangle is 3 centimeter, and a height of the rectangle is 1 centimeter; and
    wherein a length of the buffering part is equal to a length of the lower end surface of the anisotropic conductive film pressure knife, a width of the buffering part is equal to a width of the lower end surface of the anisotropic conductive film pressure knife.

2. The buffer component according to claim 1, wherein the first elastic material is the same as the second elastic material, the buffer component has an integrated structure.

3. The buffer component according to claim 2, wherein the buffer component is an integrated element made of silica gel.

4. The buffer component according to claim 2, wherein the buffer component is an integrated element made of rubber.

5. A buffer component, applied in a pressing device configured for attaching an anisotropic conductive adhesive film on a display panel, the pressing device comprising an anisotropic conductive film pressure knife, wherein, the buffer component comprises:
    an inserting part, configured to insert into a groove of a lower end of the anisotropic conductive film pressure knife, wherein a cross section of the inserting part is a regular polygon, the inserting part is matched with the groove of the anisotropic conductive film pressure knife in shape, when changing the buffer component, the inserting part is gradually filled into the groove along the groove; and
    a buffering part, connected to the inserting part, wherein the buffering part is configured to attach to a lower end surface of the lower end of the anisotropic conductive film pressure knife, a cross section of the buffering part is a rectangle;
    the buffer component is an integrated element made of rubber;
    wherein a cross section of the inserting part is a trapezoid, a topline of the trapezoid has a length of 1.6 centimeter, a baseline of the trapezoid has a length of 1 centimeter, a height of the trapezoid has a length of 1.5 centimeter, a length of the rectangle is 3 centimeter, and a height of the rectangle is 1 centimeter; and
    wherein a length of the buffering part is equal to a length of the lower end surface of the anisotropic conductive film pressure knife, a width of the buffering part is equal to a width of the lower end surface of the anisotropic conductive film pressure knife.

6. A pressing device, configured to press an anisotropic conductive film on a display panel, wherein, the pressing device comprises:
    an anisotropic conductive film pressure knife, a lower end of the anisotropic conductive film pressure knife defines a groove, and
    a buffer component, the buffer component comprises:
    an inserting part, made of a first elastic material, wherein the inserting part is received in the groove of the anisotropic conductive film pressure knife, the inserting part is matched with the groove of the anisotropic conductive film pressure knife in shape, when changing the buffer component, the inserting part is gradually filled into the groove along the groove; and
    a buffering part, made of a second elastic material, wherein the buffering part connects to the inserting part, and the buffering part is configured to attach to a lower end surface of the lower end of the anisotropic conductive film pressure knife;

wherein a cross section of the inserting part is a trapezoid, a cross section of the buffering part is a rectangle, a topline of the trapezoid has a length of 1.6 centimeter, a baseline of the trapezoid has a length of 1 centimeter, a height of the trapezoid has a length of 1.5 centimeter, a cross section of the buffering part is the rectangle, a length of the rectangle is 3 centimeter, and a height of the rectangle is 1 centimeter;

and wherein a length of the buffering part is equal to a length of the lower end surface of the anisotropic conductive film pressure knife, a width of the buffering part is equal to a width of the lower end surface of the anisotropic conductive film pressure knife.

7. The pressing device according to claim 6, wherein the first elastic material is the same as the second elastic material, the buffer component has an integrated structure.

8. The pressing device according to claim 7, wherein the buffer component is an integrated element made of silica gel.

9. The pressing device according to claim 7, wherein the buffer component is an integrated element made of rubber.

10. The pressing device according to claim 6, wherein the groove of the anisotropic conductive film pressure knife is matched with the inserting part in shape.

* * * * *